United States Patent [19]

Yuda

[11] Patent Number: 4,492,400

[45] Date of Patent: Jan. 8, 1985

[54] ROBOTIC GRIPPER OPERATOR MECHANISM

[76] Inventor: Lawrence F. Yuda, P.O. Box 176, Westminster, S.C. 29693

[21] Appl. No.: 479,502

[22] Filed: Mar. 28, 1983

[51] Int. Cl.³ .............................................. B25J 15/00
[52] U.S. Cl. ...................................... 294/88; 294/115
[58] Field of Search ...................... 294/88, 95, 97, 106, 294/115, 116; 74/99 R, 99 A; 269/34, 218, 233, 234; 414/753; 901/31, 36–39

[56] References Cited

U.S. PATENT DOCUMENTS

| | | | |
|---|---|---|---|
| 1,813,695 | 7/1931 | Brockschmidt | 294/115 |
| 1,950,757 | 3/1934 | Smith-Stange | 294/116 X |
| 2,176,333 | 10/1939 | Elving | 294/115 |
| 3,386,297 | 6/1968 | Willis | 294/88 X |
| 3,881,763 | 5/1975 | Benson | 294/116 |
| 4,211,123 | 7/1980 | Mack | 294/116 X |
| 4,234,223 | 11/1980 | O'Neil | 294/116 X |

FOREIGN PATENT DOCUMENTS 946710  6/1949  France .............................. 294/115

Primary Examiner—Johnny D. Cherry
Attorney, Agent, or Firm—Bailey & Haraway

[57] ABSTRACT

A robotic gripper is illustrated having improved operator mechanism facilitating the use of multiple fingers or jaws for picking up objects of various shapes including round objects. The operator mechanism includes a fluid-operated plunger having transverse grooves each forming, together with an opposite groove in each of the respective fingers, a seat for the bearings.

5 Claims, 4 Drawing Figures

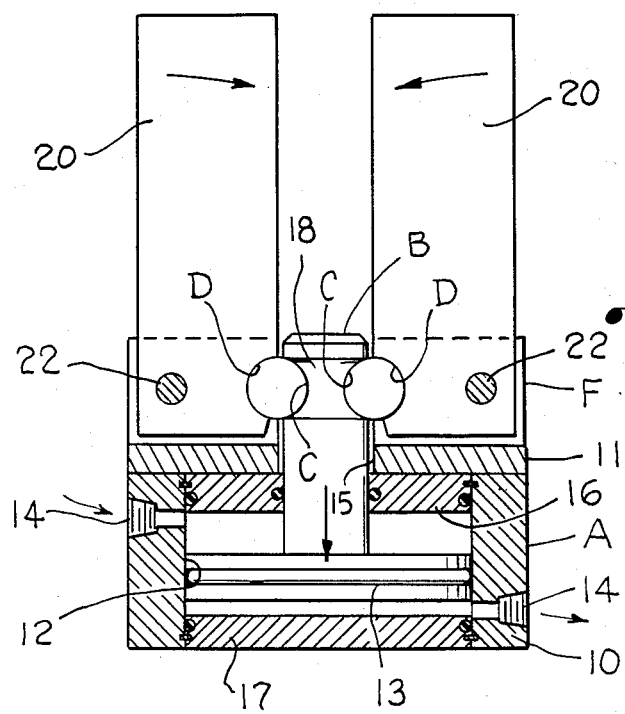
*Fig. 3-B.*
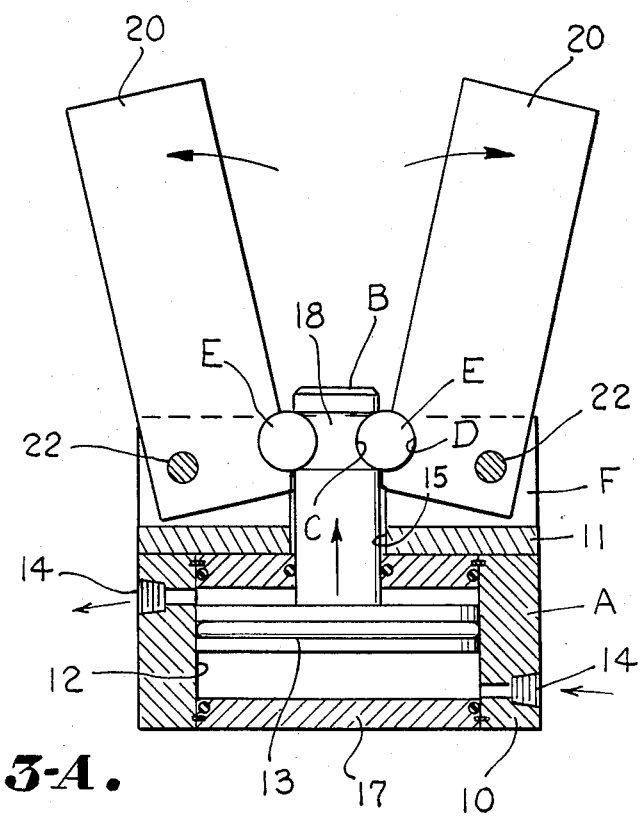
*Fig. 3-A.*

ROBOTIC GRIPPER OPERATOR MECHANISM

BACKGROUND OF THE INVENTION

Pick and place robotic grippers having bearing or bushing members for opening and closing an opposed pair of fingers are illustrated in U.S. Pat. Nos. 4,211,123 and 4,234,223. A fluid-operated power actuator is illustrated in U.S. Pat. No. 4,167,134. Prior art grippers generally use opposed fingers, which limit them to simple pick and place operations wherein the shape of the articles which may be handled as well as the relative amount of gripping action afforded is severely circumscribed. Due to the fact that parts having close tolerances including a plunger in the form of a clevis bracket with mating joint is required, a relatively expensive construction has been the result. Due to the complexity of prior art constructions such did not readily lend themselves to mass production.

Accordingly, it is an important object of this invention to provide an improved robotic gripper of simplified construction which will be relatively inexpensive to manufacture.

Another important object of this invention is to provide a robotic gripper having simplified operator mechanism facilitating a versatile jaw or gripper finger arrangement facilitating the size and variety of objects which may be handled thereby.

SUMMARY OF THE INVENTION

It has been found that an improved and more versatile robotic gripper may be provided employing a fluidoperated plunger having transverse grooves forming seats for retaining free bearing members which are operable within snuggly fitting grooves within the jaw or finger members. Moreover, inwardly facing V-shaped bracket members may be provided forming a retainer for the bearings as well as a receptacle between each of the adjacent sides for pivotally mounted respective fingers therebetween.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 2:
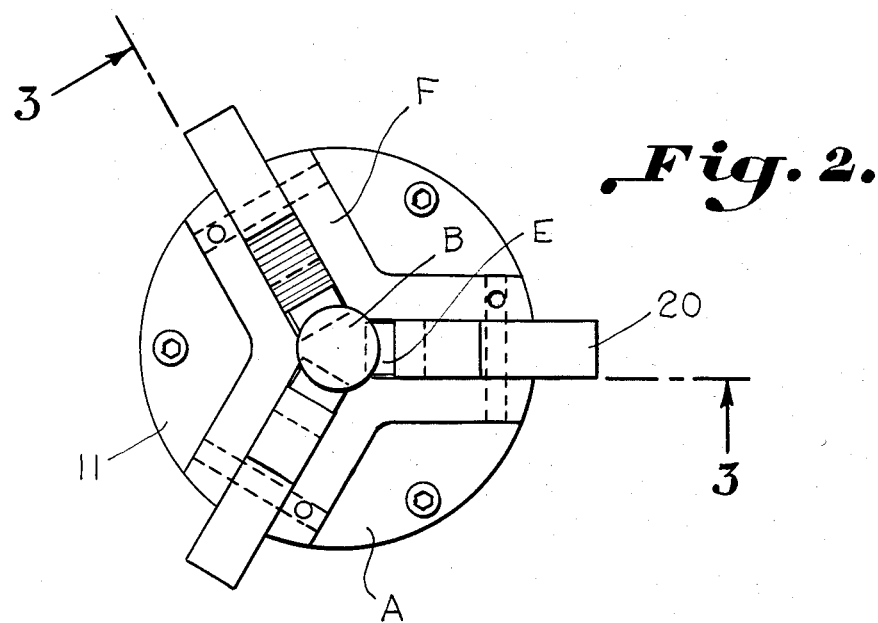
FIG. 2 is a plan view further illustrating the robotic gripper of FIG. 1, at a reduced scale, FIG. 3—A is a transverse sectional elevation taken on the line 3—3 in FIG. 2 illustrating the robotic gripper with the plunger in extended position with the jaws or fingers opened and for receiving an article, FIG. 3—B is a sectional elevation similar to FIG. 3—A with the plunger retracted and the fingers in closed or gripping position.
Figure 1:
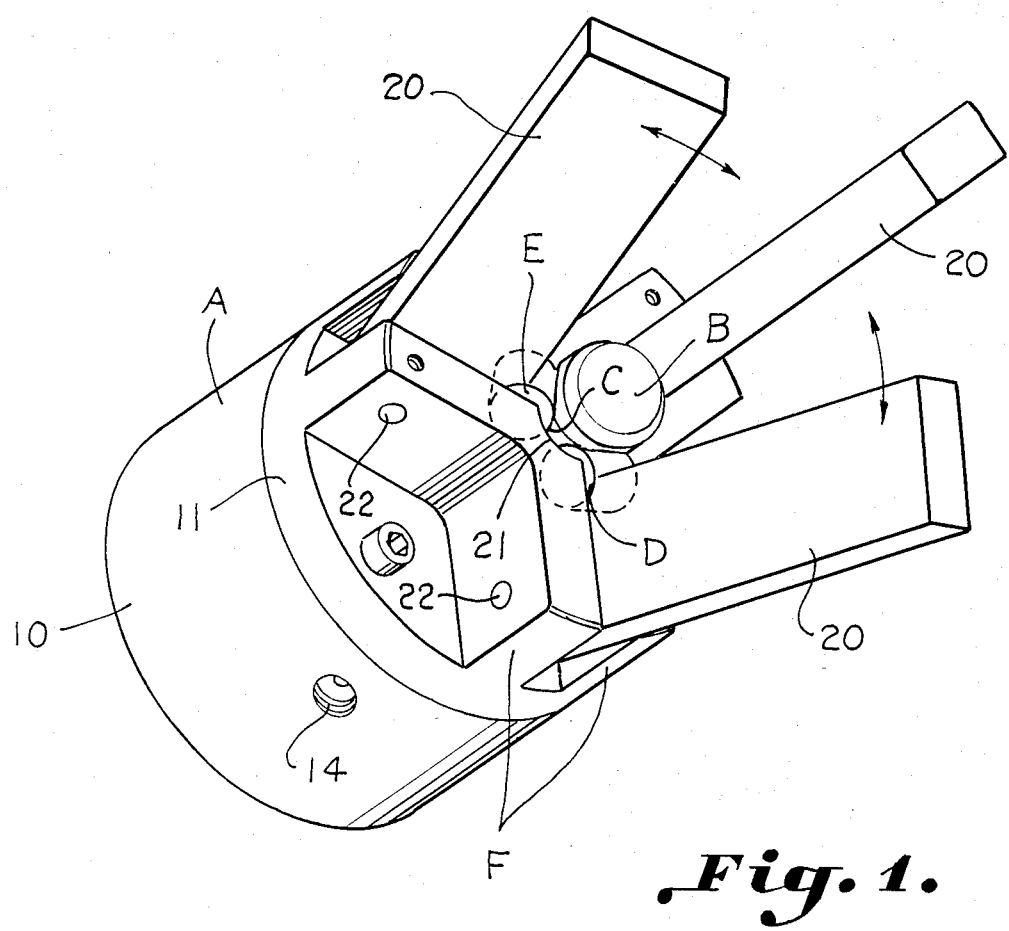
FIG. 1 is a perspective view illustrating a robotic gripper and operator mechanism therefor, constructed in accordance with the present invention.

The drawings illustrate a robotic gripper having a housing A carrying a fluid-operated piston with a plunger B connected in axial alignment therewith. A plurality of fingers each have pivotal connection to the housing adjacent the plunger. A transverse groove C is carried in the plunger opposite each of the fingers. A corresponding groove D is positioned in each finger opposite each of the first mentioned grooves. A free bearing member E is carried in each of respective seats formed by opposed respective grooves. Thus, a power stroke operating the fingers is exerted responsive to a power stroke of the piston. Three V-shaped bracket members F carried by and extending outwardly of the housing, each have an apex facing inwardly serving as a retainer for the bearings. Each bracket has legs which together with an adjacent leg of another V-shaped bracket member, forms a receptacle having opposed sides for pivotally mounting respective fingers therebetween.

The housing A includes a block portion 10 and a head 11 which carries the upstanding bracket F integrally therewith. The block has a cylinder 12 therein for carrying a piston 13 which is provided with fluid inlets 14 for forcefully moving the cylinder up and down in both directions.

The cylinder has a plunger B connected in axial alignment and an outwardly extending portion passes through an opening 15 within the head 11. A suitable closure member 16 is provided about the plunger B and an end member 17 completes the enclosure cylinder for the piston 13. The plunger B has a number of overlapping transverse grooves 18 extending thereacross adjacent its free end opposite the cylinder (FIGS. 3—A and 3—B). The grooves 18 may be triangular in cross section rather than arcuate as shown, and a single groove may extend entirely about the circumference of the plunger giving point contact with the cylindrical bearing in lieu of the separate grooves, one for each bearing as shown.

A number of fingers or jaw members are illustrated at 20. Three such fingers are illustrated and are circumferentially spaced through angles of 120°. It is to be understood, however, that more or less opposing fingers may be employed, as for example, the usual two fingers spaced 180° apart or even, four fingers may be utilized.

A number of suitably spaced seats are provided for containing the free bearing members E and are formed by the transverse arcuate grooves C carried by the plunger and being within the circular groove 18 carried adjacent the free end of the plunger. The seats also include the arcuate grooves D carried within opposed portions of the fingers conforming closely to the bearing members. The grooves in the fingers may be triangular, other than arcuate, but contact would not be as effective. The V-shaped bracket members F have opposed portions for retaining the free cylindrical bearing members within the seats together with curved apex portions 21 of the respective bracket members F which also serve to accommodate the free end of the plunger B.

It will be observed that remote outwardly spaced portions of the brackets accommodate transversely extending pins 22 which serve as pivot points for the fingers at remote outwardly spaced points from the power operator members, including the free bearing members, in order to thus maximize the power multiplier.

It is thus seen that a relatively inexpensive gripper has been provided utilizing a minimal number of machined parts. Tolerances have in many instances been reduced and a more versatile gripper results capable of maximizing loads as well as the shape of objects which may be moved from place to place has been facilitated. Since the fingers of the gripper are powered in both directions the gripper hereof may be used for both 0D and 1D gripping.

While a preferred embodiment of the invention has been described using specific terms, such description is for illustrative purposes only and it is to be understood that changes and variations may be made without departing from the spirit or scope of the following claims.

What is claimed is:

1. A robotic gripper having a housing carrying a fluid-operated piston with a plunger connected in axial alignment therewith comprising:
    a plurality of gripping fingers each pivotally connected to said housing adjacent said plunger;
    a transverse arcuate groove in said plunger opposite each of said fingers;
    a corresponding groove in each finger opposite a said first mentioned groove and forming respective seats therewith; and
    a free bearing member retained within each of said respective seats formed by opposed respective grooves;
    whereby a power stroke operating said fingers is exerted responsive to a power stroke of said piston.

2. The structure set forth in claim 1 wherein said bearing member is cylindrical and a groove in each of said fingers corresponds closely thereto.

3. The structure set forth in claim 2 wherein three circumferentially spaced fingers extend outwardly of said housing.

4. A robotic gripper having a housing carrying a fluid-operated piston with a plunger connected on one end in axial alignment therewith comprising:
    a plurality of outwardly extending bracket members carried by one end of said housing opposite the other end of said plunger;
    a plurality of gripping fingers each pivotally carried by said bracket members for connection to said housing opposite and remote from said plunger;
    a transverse arcuate groove in said plunger opposite each of said fingers;
    a corresponding groove in each finger opposite a said first mentioned groove and forming respective seats therewith; and
    a free bearing member retained within each of said respective seats formed by opposed respective grooves;
    whereby a power stroke operating said fingers is exerted responsive to a power stroke of said piston.

5. The structure set forth in claim 4 wherein three V-shaped bracket members each having an apex facing inwardly forming a retainer for said bearing members with respective outwardly diverging legs forming, together with an adjacent leg of the other V-shaped bracket members, a receptacle having opposed sides for pivotally mounting respective fingers therebetween.

* * * * *